US008807574B2

(12) United States Patent
Kohlhauser et al.

(10) Patent No.: US 8,807,574 B2
(45) Date of Patent: Aug. 19, 2014

(54) SPRING-DAMPER UNIT FOR HEIGHT ADJUSTMENT OF A VEHICLE

(75) Inventors: Matthias Kohlhauser, Graz (AT); Hansjörg Pöhler, Grambach (AT)

(73) Assignee: Magna Steyr Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/698,038

(22) PCT Filed: May 10, 2011

(86) PCT No.: PCT/EP2011/002313
§ 371 (c)(1),
(2), (4) Date: Dec. 13, 2012

(87) PCT Pub. No.: WO2011/141155
PCT Pub. Date: Nov. 17, 2011

(65) Prior Publication Data
US 2013/0200578 A1  Aug. 8, 2013

(30) Foreign Application Priority Data

May 14, 2010  (DE) .......................... 10 2010 020 539
May 10, 2011  (WO) ................. PCT/EP2011/002313

(51) Int. Cl.
*B60G 17/016* (2006.01)
*B60G 15/07* (2006.01)

(52) U.S. Cl.
USPC ....... 280/5.51; 267/221; 267/278; 280/5.514; 280/6.157; 280/124.151; 280/124.154

(58) Field of Classification Search
USPC ......... 267/195, 217, 221, 275, 277, 278, 286; 280/5.51, 5.514, 6.157, 6.159, 280/124.145–124.147, 124.151, 124.154
See application file for complete search history.

(56) References Cited

U.S. PATENT DOCUMENTS

| 2,290,923 A * | 7/1942 | Wahlberg ................ 280/86.757 |
|---|---|---|
| 4,377,298 A * | 3/1983 | Finn et al. ............... 280/124.142 |
| 5,338,055 A * | 8/1994 | Mauz ..................... 280/124.147 |
| 5,372,377 A * | 12/1994 | Lee ........................ 280/124.143 |
| 6,857,625 B2 * | 2/2005 | Loser et al. .................. 267/175 |
| 7,469,910 B2 * | 12/2008 | Munster et al. ............ 280/5.514 |
| 7,475,883 B2 * | 1/2009 | Christophel et al. ....... 280/5.514 |
| 7,644,935 B2 * | 1/2010 | Munster et al. ............ 280/5.514 |
| 7,722,056 B2 * | 5/2010 | Inoue et al. ................ 280/5.512 |
| 7,780,177 B2 * | 8/2010 | Michel .................. 280/124.146 |
| 7,857,335 B2 * | 12/2010 | Wilfried ................. 280/124.155 |
| 7,874,561 B2 * | 1/2011 | Michel ........................ 280/6.157 |
| 7,922,181 B2 * | 4/2011 | Hakui et al. ............... 280/6.157 |

(Continued)

*Primary Examiner* — Paul N Dickson
*Assistant Examiner* — Laura Freedman
(74) *Attorney, Agent, or Firm* — Jordan IP Law, LLC; Todd A. Vaughn

(57) ABSTRACT

A spring shock absorber unit for adjusting the elevation of a vehicle, including an oscillation absorber, a support spring to absorb shocks impacting the vehicle, an upper spring seat at which the support spring is supported, an adjustment device for adjusting the height of the upper spring seat with an actuator and an adjustment mechanism configured to convert the rotary motion generated by the actuator into a translational motion of the upper spring seat, an axial bearing for supporting the spring shock absorber unit, particularly the upper spring seat and/or a piston rod at a body of a vehicle, optimal utilization of the space available shall be possible in spite of a plurality of functional elements. The adjustment mechanism can additionally serve the function of an axial bearing.

18 Claims, 2 Drawing Sheets

(56) References Cited

U.S. PATENT DOCUMENTS

| | | | |
|---|---|---|---|
| 7,926,822 B2 * | 4/2011 | Ohletz et al. | 280/5.514 |
| 8,205,864 B2 * | 6/2012 | Michel | 267/218 |
| 8,371,588 B2 * | 2/2013 | Kohlhauser et al. | 280/5.514 |
| 8,376,329 B2 * | 2/2013 | Michel | 267/140.5 |
| 8,454,029 B2 * | 6/2013 | Michel | 280/5.514 |
| 2006/0163863 A1 * | 7/2006 | Ellmann et al. | 280/788 |
| 2013/0020748 A1 * | 1/2013 | Kohlhauser et al. | 267/217 |

* cited by examiner

SPRING-DAMPER UNIT FOR HEIGHT ADJUSTMENT OF A VEHICLE

CROSS-REFERENCE TO RELATED APPLICATIONS

The present application is a National Stage Application of PCT International Application No. PCT/EP2011/002313 (filed on May 10, 2011), under 35 U.S.C. §371, which claims priority to German Patent Publication No. 10 2010 020 539.7 (filed on May 14, 2010), which are each hereby incorporated by reference in their respective entireties.

FIELD OF THE INVENTION

The present invention relates to a spring shock absorber unit for adjusting the elevation of a vehicle, a wheel suspension system and a motor vehicle.

BACKGROUND OF THE INVENTION

For the static and dynamic level control and/or height adjustment of vehicles elastic coils and wheel-guiding spring struts are known, for example the McPherson spring strut, in which an adjustment means is arranged between one end of the spring and the body. This adjustment means ensures the optimum vehicle level even under changing load conditions and/or allows an additionally optional adjustment in height. The level control and/or height adjustment occurs here with the help of a mobile spring seat.

DE 10 2008 013 913 A1 discloses a wheel suspension for steered wheels of motor vehicles, which show an upper and a lower spring seat, between which a coil spring is arranged. The upper spring seat is clamped facing the vehicle body, while the lower spring seat is connected fixed to the damping tube of a shock absorber. An actuator is provided around the shock absorber to adjust the height of the chassis, which acts via an actuator drive upon the upper spring seat with an axial roller bearing being interposed, here. Here, the axial bearing is arranged in the axial adjustment part of the actuator drive. In the complex connection of the necessary functional elements this arrangement requires large construction space, which must be available at least for each steered wheel of a motor vehicle.

SUMMARY OF THE INVENTION

The objective of the present invention therefore comprises to provide a spring shock absorber unit, a wheel suspension system, and a motor vehicle in which, in spite of the many functional elements, an optimum utilization of space available is possible. Further the spring shock absorber unit, the wheel suspension system, and the motor vehicle shall be cost-effective in their production.

This objective is attained in a spring shock absorber unit for adjusting the elevation of a vehicle, comprising an oscillation absorber, a support spring to absorb shocks influencing the vehicle, an upper spring seat, at which the support spring is supported, an adjustment device for adjusting the elevation of the upper spring seat, with an actuator and an adjustment mechanism, with preferably the adjustment mechanism being embodied to convert the rotary motion generated by the actuator into a translational motion of the upper spring seat, an axial bearing to support the spring shock absorber unit, particularly the upper spring seat and/or a piston rod at a body of a vehicle, with the adjustment mechanism additionally, preferably exclusively, forming the axial bearing.

By such a simple design less structural space is required, because a separate axial bearing can be waived. Here, the function of the axial bearing is performed by the adjustment mechanism itself. In addition to saved structural space, by the omission of the separate roller bearing costs and weight of the spring shock absorber unit are reduced as well. Beneficially the axial bearing supports at least one mobile component, preferably several mobile components of the spring shock absorber unit with regards to at least one component, preferably several components of the spring shock absorber unit connected in a fixed manner to the body of the motor vehicle and preferably the axial bearing compensates axial forces, particularly in the direction of an axis of the spring shock absorber unit, particularly the piston rod, and/or the axial bearing compensates a rotary motion, particularly about the axis of the spring shock absorber unit, of at least one mobile component of the spring shock absorber unit. The mobile components particularly perform a rotary motion about the axis and/or a translational motion parallel in reference to the axis.

Advantageously the spring shock absorber unit comprises no separate axial bearing in addition to the actuating mechanism and/or the actuating mechanism is embodied as a threaded drive, which comprises a threaded drive shaft with an external thread with a preferably slight pitch to compensate the distortion and/or support of the support spring, which engages a threaded drive nut connected to the upper spring seat, which axially encompasses the treaded drive shaft and comprises an internal thread with the same preferably slight pitch. The use of a threaded drive with threads showing only a slight pitch allows to compensate distortion without the axial position of the upper spring seat being considerably altered. Here, the threaded drive shows high strength. This feature is used for the axial bearing operating for the distortion and support of the support spring. Beneficially a bearing of the actuator mechanism, particularly an axial one, is not considered a separate axial bearing.

In particular, the preferably slight pitch of the internal and external thread is equivalent to a change in elevation of one convolution of the internal and external thread by less than 5 mm, 4 mm, 3 mm, or 2 mm and/or a distortion of the threaded drive shaft by 45° is equivalent to a change in elevation of the upper spring seat by less than 1 mm, or 0.45 mm, or 0.35 mm, or 0.25 and/or the internal and external thread are embodied such that in a distortion of the threaded drive shaft by 45° in a fixed threaded drive nut the change in elevation of the upper spring seat amounts to less than 2 mm, or 1 mm, or 0.55 mm, or 0.35 mm, or 0.25 mm. A small amount of the change in elevation of the upper spring seat by the rotation is irrelevant in practice for a steering motion.

In another embodiment, the threaded drive is embodied as a ball drive or a planetary drive. This leads to a particularly low-friction solution, which allows smooth steering characteristics.

In a supplementary embodiment, the support spring is connected, particularly radially in a form-fitting fashion, to the upper spring seat and/or from the wheel-guiding spring shock absorber unit a steering motion of a wheel can be performed and/or a steering motion of the wheel leads to an altered elevation of the spring shock absorber unit. From this form-fitting connection of the support spring at the upper spring seat torque-proofing results of the upper spring seat as well as the threaded drive nut connected fixed to the upper spring seat. Beneficially the wheel is fastened at the spring shock absorber unit. In a steering motion the wheel, fastened at the spring shock absorber unit, performs a rotary motion, particularly about the axis of the spring shock absorber unit, preferably the piston rod. Due to the fact that the adjustment mechanism simultaneously forms the axial bearing the threaded drive nut performs a rotary motion of the wheel during said steering motion. This leads to a slight change in elevation during the steering motion.

In one variant the actuator comprises an electric, pneumatic, or hydraulic engine to drive the actuating mechanism. Depending on the operation of the spring shock absorbing—unit the drives for the actuating mechanism can be selected such that no constructive changes are necessary at the spring shock absorber unit.

Preferably the electric, pneumatic, or hydraulic engine is arranged above the vehicle dome of the vehicle body and/or the upper spring seat. This way, the construction space underneath the spring dome and/or the upper spring seat can be used exclusively for the remaining functional mechanic elements of the spring shock absorber unit, thus improving the space requirements.

Beneficially the electric, pneumatic, or hydraulic engine are connected to the vehicle body and/or the chassis in a fixed, i.e. not mobile fashion. Thus, mobile electric connections for the drive are omitted. The fixed connections are easily accessible at any time. By this external position of the motor good cooling can also be realized.

In another embodiment the electric engine, the pneumatic, or the hydraulic engine are embodied as annular engines. Due to the fact that the annular engine preferably shows a large diameter, due to the strong torque applied by this annular engine no additional transmission is necessary for the threaded drive. This leads to a low construction height, thus little construction height is also required above the spring dome or the upper spring seat.

Particularly the annular engine comprises a rotor and a stator, arranged concentrically in reference to each other, with the rotor of the annular engine being connected fixed to the threaded drive shaft of the adjustment mechanism to convert the rotary motion into the translational motion, preferably at least during the adjustment process. The radial design of the annular engine leads to further space savings at the installation site in the motor vehicle.

In a further embodiment, the annular engine comprises an opening to accept a piston rod of the oscillation absorber, which is connected elastically to the adjustment device. This way, more space is available for the necessary support of the piston rod of the spring shock absorber unit.

In a further development, the rotary axis of the electric, pneumatic, or hydraulic engine essentially extends identical to the axis of the support spring or the axis of the piston rod of the oscillation absorber, e.g., with a deviation of less than 1 cm, or 0.5 cm, or 0.2 cm, which is preferably encased by a damping tube to compensate vehicle oscillations. This way the existing space available can be optimally used for the motions of the spring shock absorber unit occurring.

In a complementary variant, a lower spring seat is fastened at the damping tube, which is connected via the support spring to the upper spring seat, with the upper and the lower spring seat being supported displaceable in the direction of the axis of the piston rod or in the direction of the axis of the support spring. This design also contributes to the optimal utilization of the existing construction space in an optimal and reliable execution of the function of the spring shock absorber unit.

A wheel suspension system in accordance with the invention comprises a spring shock absorber unit, a track control arm, and a tie rod, with the spring shock absorber unit being embodied as a spring shock absorber unit embodied as described in this patent application.

The motor vehicle in accordance with the invention comprises a spring shock absorber unit described in this patent application and/or a wheel suspension system also described in this patent application.

BRIEF DESCRIPTION OF THE DRAWINGS

In the following an exemplary embodiment of the invention is described in greater detail with reference to the attached drawings. It shows.

DETAILED DESCRIPTION OF EMBODIMENTS

Figure 1:
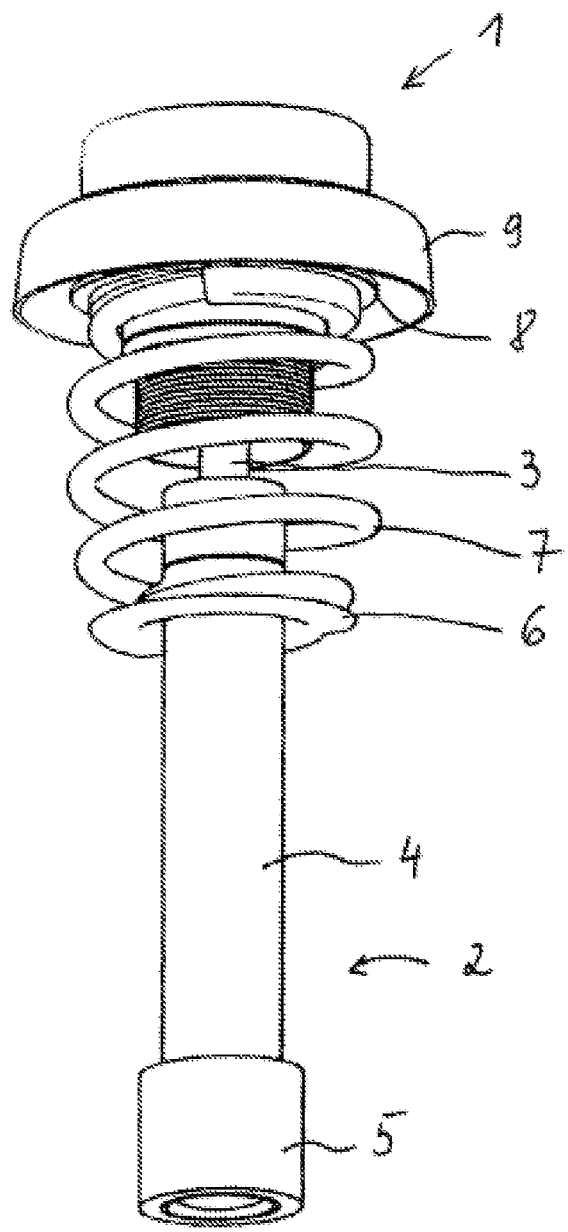
FIG. 1 illustrates a spring shock absorber unit in the form of a McPherson spring strut.

FIG. 1 shows a McPherson spring strut known per se for a motor vehicle not shown in greater detail. This represents a particular form of a spring shock absorber unit 1 for independent wheel suspension. The spring shock absorber unit 1 provides the connection between a wheel support with a wheel (not shown) to the body of the motor vehicle. The spring shock absorber unit 1 comprises a shock absorber 2, which includes a piston rod 3 guided in a cylindrical damper tube 4. The damper tube 4 of the shock absorber 2 guides with a bottom end 5 an axial leg, not shown. A lower spring seat 6 is fastened at the other end of the damper tube 4, with a support spring 7 resting thereon, embodied as a helical spring. The opposite upper end of the support spring 7 leads to an upper spring seat 8, which is covered by the vehicle dome 9. A bellows is arranged between the upper spring seat 8 and the vehicle dome 9, not transferring any forces from the spring seat 8 to the vehicle dome 9.

Figure 2:
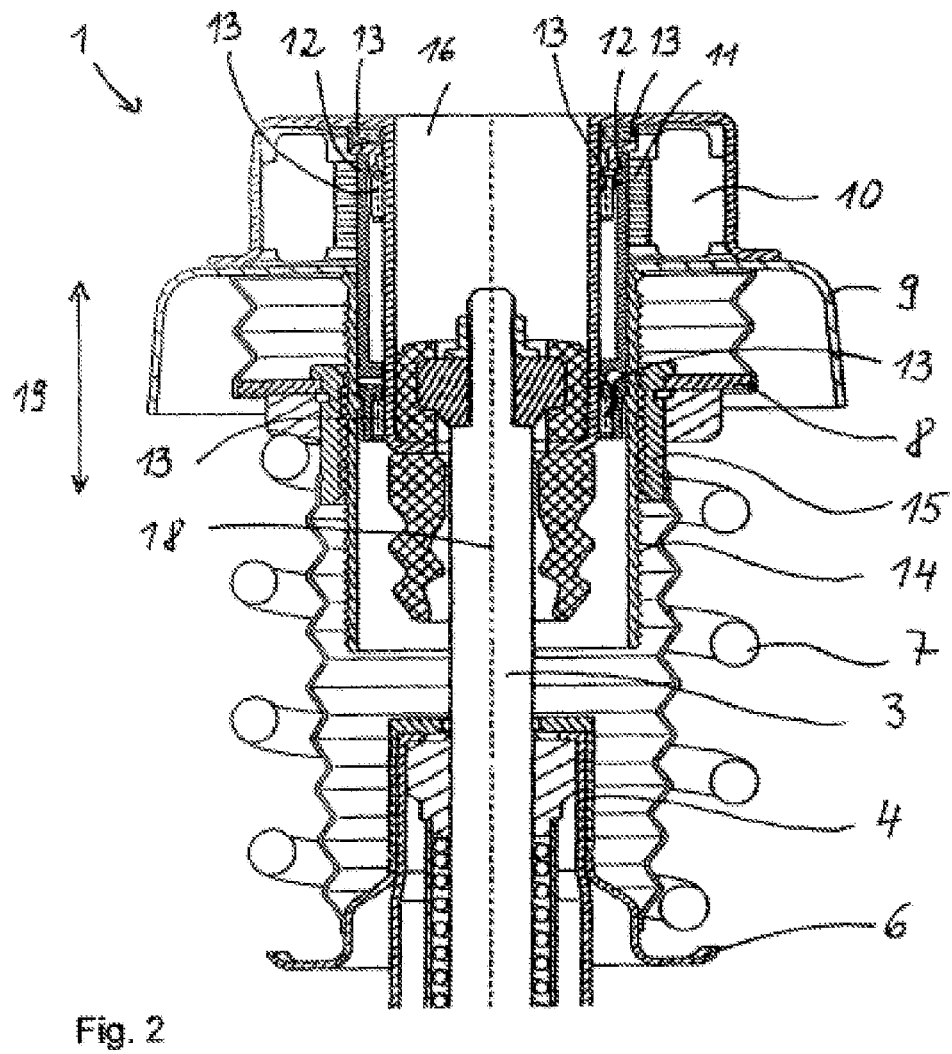
FIG. 2 illustrates a longitudinal cross-section through the spring shock absorber unit.

As discernible from the longitudinal cross-section in FIG. 2, an electric engine embodied as an annular engine is arranged above the vehicle dome 9, which comprises a stator 10, encasing a rotor 11 in a concentric fashion. A threaded drive shaft 12 is arranged and/or fastened fixed at the rotor 11, which via bearings 13 of the adjustment mechanism as roller bearings is guided, particularly using rolls or needle rolls, and thus also performs the rotary motion of the rotor 11. The uppermost bearing 13 of the adjustment mechanism is an axial bearing 13 of the adjustment mechanism and the second and third bearings 13 of the adjustment mechanism, seen from the top, are radial bearings 13 of the adjustment mechanism. The bearings 13 of the adjustment mechanism are a part of an adjustment mechanism and support rotating components of the adjustment mechanism, particularly the threaded drive shaft 12. The threaded drive shaft 12 is provided with an external thread 14, which extends on the one side almost to the vehicle dome 9 and on the other side is guided and/or embodied along the piston rod 3 outside the damper tube 4. The threaded drive shaft 12 is shown in FIG. 2 with a different hatching (the upper hatching shows a lower distance than the lower hatching).

The external thread 14 of the threaded drive shaft 12 engages an internal thread of a threaded drive nut 15, not shown, which is connected to the upper spring seat 8 in a torque-proof fashion. Here, the external and internal threads show a slight incline. At a distortion of the threaded drive shaft 12 by 45° a displacement in height of only 0.35 mm is realized.

Furthermore, the annular engine with its stator 10 and the rotor 11 is embodied very flat and shows a large central opening 16, which the piston rod 3 can engage elastically to compensate vehicle oscillations. The annular engine shows a large diameter and is embodied very flat, thus a strong torque develops to drive the threaded drive shaft 12, which can be transmitted without an additional interim transmission to the threaded drive nut 15.

Figure 3:
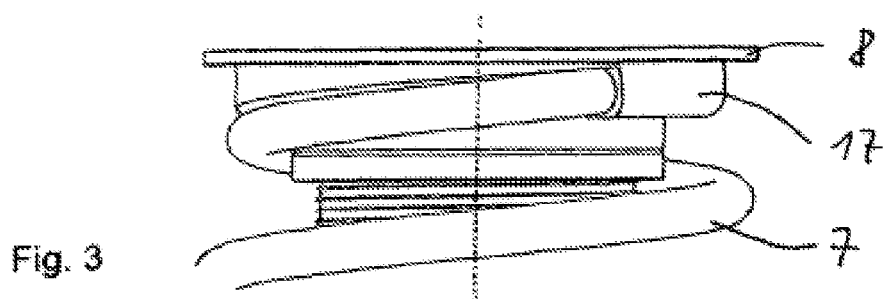
FIG. 3 illustrates a detail of a support spring at an upper spring seat.

The fastening of the support spring 7 at the upper spring seat 8 is shown in FIG. 3. Here, the upper end of the support spring 7 is inserted into an accept 17 in a form-fitting fashion, which is formed underneath the spring seat 8. A similar fastening is possible at the lower end of the support spring 7 at the lower spring seat 6, with the accept 17 being respectively arranged on the lower spring seat 6. This way, the two ends of the support spring 7 is fastened fixed at the lower and upper spring seats 6, 8. Due to this form-fitting accept 17 at the upper and lower spring seat 6, 8 any distortion of the support spring 7 between the upper and the lower spring seat 7 is prevented and simultaneously torque-proofing is achieved for the upper spring seat 8 and thus also the threaded drive nut 15. The connection of the support spring 7 at the upper and and/or lower spring seat 6, 8 may also occur in a force-fitting and/or material-to-material fashion, with this preferably also being possible supplementary to the form-fitting connection (not shown).

The axial pre-stressing of the support spring 7 is adjusted with the help of the annular engine. Depending on the pre-stressing to be adjusted the rotor 11 rotates, with here, together with the rotation of the rotor 11, the threaded drive shaft 12 is also distorted. The external thread 14 formed at the threaded drive shaft 12 engages the internal thread of the threaded drive nut 15, causing it to perform a translational motion in the direction towards the axis 18 of the piston rod 3, which is indicated by the direction of the arrow 19 in FIG. 2. By this movement of the threaded drive nut 15 the position of the upper spring seat 8 changes and thus also the force applied by the support spring 7, depending on the direction the upper spring seat 8 is being displaced.

The threaded drive shaft 12 comprises two parts. A first upper part is shown in FIG. 2 hatched with a short distance and a second bottom part is shown in FIG. 2 by a hatching with a wide distance, and also comprising the external thread 14. During a rotary motion of the threaded drive shaft 12 and an axial motion of the upper spring seat 8 connected thereto the bottom part of the threaded drive shaft 12 is slightly lifted off the vehicle dome 9 by a mechanism, not shown, so that no forces can be transferred from the bottom part of the threaded drive shaft 12 to the vehicle dome 9. The axial forces compensated by the spring seat 8 are introduced via the threaded drive shaft 12 and the upper axial bearing 13 of the adjustment mechanism particularly via the component, not mobile, at the opening 16 into the body of the motor vehicle. In a stationary threaded drive shaft 12, i.e. outside an adjustment process, the bottom part of the threaded drive shaft 12 of the mechanism, not shown, rests on the vehicle dome 9 and the axial forces are transferred from the upper spring seat 8 via the threaded drive nut 15 and the lower part of the threaded drive shaft 12, particularly directly, to the vehicle dome 9 and preferably from the non-mobile vehicle dome 9 to the rest of the body.

When a steering motion is performed, the wheel rotates about the axis 18 of the spring shock absorber unit 1. Here, the damper tube 4 rotates together with the bottom spring seat 6. Via the form-fitting connection of the support spring 7 to the bottom spring seat 6 this rotary motion is transferred via the support spring 7 to the upper spring seat 8, which is also connected to the support spring 7 in a form-fitting fashion. Here, the upper spring seat 8 entrains the threaded drive nut 15. Due to the presence of the low-friction threaded drive shaft 12 with the slight pitch of the external thread 14 a flawless steering motion is possible and simultaneously an axial support of the support spring 7 is ensured. A slight distortion of the support spring 7 leads to only minor displacement in height, e.g., 0.45 mm, of the upper spring seat 9, because the threaded drive shaft 12 essentially abstains from following the rotary motion of the threaded drive nut 15; this slight shift in elevation is irrelevant in practice.

Overall, considerable advantages are realized by the spring shock absorber unit 1 in accordance with the invention. The function of the threaded drive shaft 12 here integrates simultaneously the function of the otherwise necessary additional axial bearing. Here, not only design space in the spring shock absorber unit 1 is saved, but by the omission of an additional roller bearing the weight as well as the costs of such a spring shock absorber unit 1 is reduced.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A shock absorber assembly comprising:
   an oscillation absorber;
   a spring configured to absorb forces of a vehicle during operation of the vehicle;
   an upper spring seat configured to support the spring, wherein the spring is connected to the upper spring seat radially; and
   an adjustment device configured to spatially adjust an elevation of the upper spring seat, the adjustment device having an adjustment mechanism and an actuator configured to drive the adjustment mechanism, the adjustment mechanism being configured to support at least one of the upper spring seat and a piston rod of the oscillation absorber at a body of the vehicle, convert rotary motion generated by the actuator into a translational motion of the upper spring seat, and prevent axial movement of the shock absorber assembly during operation of the vehicle, wherein a steering motion of a corresponding wheel of the vehicle causes an adjustment of an elevation of the spring shock absorber assembly.

2. The shock absorber assembly of claim 1, wherein the adjustment mechanism comprises a threaded drive including:
   a drive shaft with external threads having a predetermined pitch to at least one of accept distortion and to support the spring; and
   a drive nut with internal threads having the predetermined pitch and which correspond to and engages the external threads of the drive shaft and is connected to the upper spring seat and coaxially encompasses the drive shaft.

3. The shock absorber assembly of claim 2, wherein the predetermined pitch has a difference in elevation of one convolution of the internal thread and the external thread by less than one of 5 mm, 4 mm, 3 mm, and 2 mm.

4. The shock absorber assembly of claim 2, wherein a distortion of the drive shaft by 45° is equivalent to an off-set in height of the upper spring seat by less than one of 1 mm, 0.45 mm, 0.35 mm and 0.25 mm.

5. The shock absorber assembly of claim 2, wherein:
the predetermined pitch has a difference in elevation of one convolution of the internal thread and the external thread by less than one of 5 mm, 4 mm, 3 mm, and 2 mm; and
a distortion of the drive shaft by 45° is equivalent to an off-set in height of the upper spring seat by less than one of 1 mm, 0.45 mm, 0.35 mm and 0.25 mm.

6. The shock absorber assembly of claim 2, wherein the threaded drive comprises a ball drive or as a planetary drive.

7. The shock absorber assembly of claim 2, wherein the threaded drive comprises a planetary drive.

8. The shock absorber assembly of claim 1, wherein the actuator comprises one of an electric actuator, a pneumatic actuator, and a hydraulic actuator.

9. The shock absorber assembly of claim 8, wherein the actuator is arranged spatially above a vehicle dome of the body of at least one of the vehicle and the upper spring seat.

10. The shock absorber assembly of claim 8, wherein the actuator is fixedly connected to a chassis of the vehicle.

11. The shock absorber assembly of claim 8, wherein the actuator comprises an annular motor.

12. The shock absorber assembly of claim 11, wherein the annular motor comprises a rotor and a stator, which are supported concentric in reference to each other, the rotor configured for fixed connection to a drive shaft of the adjustment mechanism to convert the rotary motion into the translational motion at least during the adjustment process.

13. The shock absorber assembly of claim 12, wherein the annular motor comprises an opening configured to accept the piston rod of the oscillation absorber, and which is connected elastically to the adjustment device.

14. The shock absorber assembly of claim 13, wherein a rotary axis of the actuator extends essentially identical in reference to an axis of the spring or an axis of the piston rod of the oscillation absorber, and which is surrounded by a damping tube configured to compensate vehicle oscillations.

15. The shock absorber assembly of claim 14, further comprising a lower spring seat concentrically provided at the damping tube, and which via the spring is connected to the upper spring seat, with the upper spring seat being displaceably supported in a direction of one of the axis of the piston rod and the axis of the spring.

16. A wheel suspension system, comprising:
a track control arm;
a tie rod; and
a shock absorber assembly including:
an oscillation absorber;
a spring configured to absorb forces of the vehicle during operation of a vehicle;
an upper spring seat configured to support the spring, wherein the spring is connected to the upper spring seat radially; and
an adjustment device configured to spatially adjust an elevation of the upper spring seat, the adjustment device having an adjustment mechanism and an actuator configured to drive the adjustment mechanism, the adjustment mechanism being configured to support at least one of the upper spring seat and a piston rod of the oscillation absorber at a body of the vehicle, convert rotary motion generated by the actuator into a translational motion of the upper spring seat, and prevent axial movement of the shock absorber assembly during operation of the vehicle, wherein a steering motion of a corresponding wheel of the vehicle causes an adjustment of an elevation of the spring shock absorber assembly.

17. The wheel suspension system of claim 16, wherein the adjustment mechanism comprises a threaded drive including:
a drive shaft with external threads having a predetermined pitch to at least one of accept distortion and to support the spring; and
a drive nut with internal threads having the predetermined pitch and which correspond to and engages the external threads of the drive shaft and is connected to the upper spring seat and coaxially encompasses the drive shaft.

18. A motor vehicle comprising:
a wheel suspension system including a track control arm, a tie rod, and a shock absorber assembly including:
an oscillation absorber;
a spring configured to absorb forces of the vehicle during operation of the motor vehicle;
an upper spring seat configured to support the spring, wherein the spring is connected to the upper spring seat radially; and
an adjustment device configured to spatially adjust an elevation of the upper spring seat, the adjustment device having an adjustment mechanism and an actuator configured to drive the adjustment mechanism, the adjustment mechanism being configured to support at least one of the upper spring seat and a piston rod of the oscillation absorber at a body of the motor vehicle, convert rotary motion generated by the actuator into a translational motion of the upper spring seat, and prevent axial movement of the shock absorber assembly during operation of the motor vehicle, wherein a steering motion of a corresponding wheel of the vehicle causes an adjustment of an elevation of the spring shock absorber assembly.

\* \* \* \* \*